Feb. 23, 1932.   L. B. BRIDGES   1,846,508
MEANS FOR CUTTING DARDELET THREADS
Filed July 9, 1929
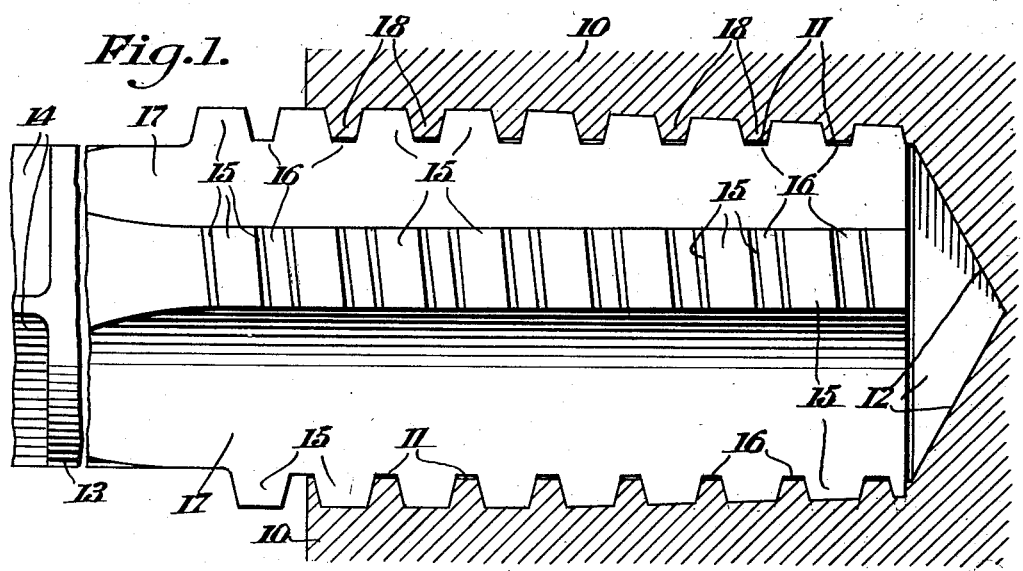
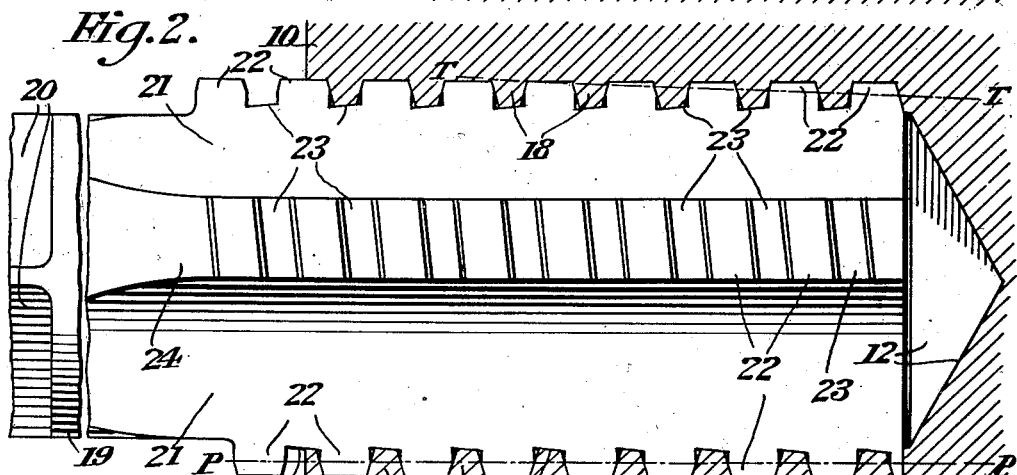
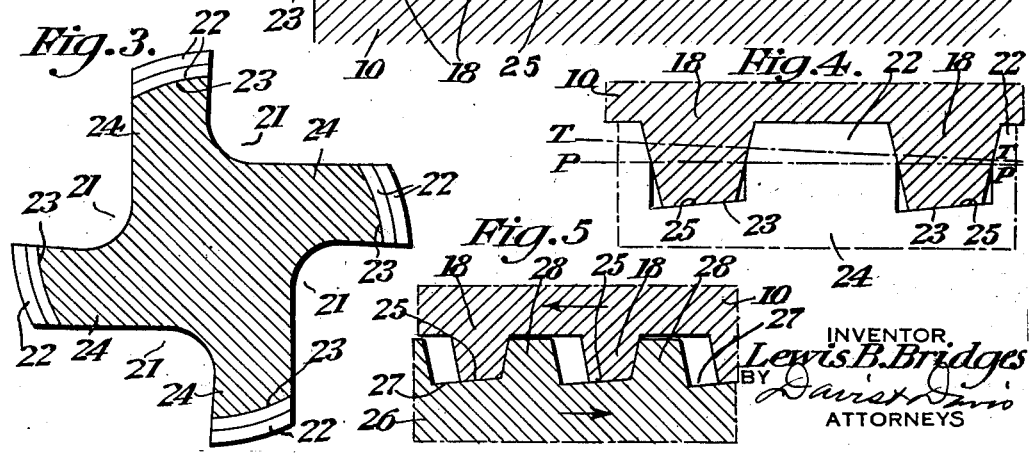
INVENTOR.
Lewis B. Bridges
BY
ATTORNEYS Patented Feb. 23, 1932

1,846,508

UNITED STATES PATENT OFFICE

LEWIS B. BRIDGES, OF BROOKLYN, NEW YORK, ASSIGNOR TO DARDELET THREADLOCK CORPORATION, OF NEW YORK, N. Y., A CORPORATION OF DELAWARE

MEANS FOR CUTTING DARDELET THREADS

Application filed July 9, 1929. Serial No. 376,989.

This invention contemplates providing an improved means for, and method of, cutting internal Dardelet threads, and has for its general objects providing for the accurate cutting of such threads in an economical manner and providing efficient cutting tools for forming the threads.

A further object of the invention is to provide an improved means for, and method of, threading bottomed holes or sockets with Dardelet threads.

Another object of the invention is to provide a bottoming or finishing tap, for use in threading bottomed holes with Dardelet threads, adapted to complete the imperfect thread grooves left in a bottomed hole by a tapered tap and also form the inclined locking surfaces on the crest of the thread rib from end to end of the thread.

Other objects and advantages of the invention will appear from the following description in detail of the improvements as exemplified in the accompanying drawings.

In the drawings:

Fig. 1 is a view showing a roughing tap of well-known type with tapered entering portion and following non-tapered portion advanced fully into a bottomed hole or socket to partially form the thread;

Fig. 2 a view similar to Fig. 1 showing an improved form of tap advanced fully into the hole, after withdrawal of the tap shown in Fig. 1, the thread being completed its full length by the action of this second tap;

Fig. 3 a view of the tap shown in Fig. 2, the tap being broken entirely through along one turn of the tap thread groove so as to show four successive cutting teeth in side elevation;

Fig. 4 a detail longitudinal sectional view showing a portion of the threaded piece and one land of the finishing tap, as in Fig. 2, on an enlarged scale; and Fig. 5 a fragmentary longitudinal sectional view showing the finished internal Dardelet thread for the piece having the bottomed hole and a complementary external Dardelet thread of a male piece in locked or self-holding relation.

The invention has been illustrated in connection with the threading of a bottomed hole with a Dardelet thread. However, in its broader aspects the invention is not limited to such application but is applicable to threading through-and-through bores in pieces, such as nut blanks, with Dardelet threads.

Referring to the drawings by reference characters 10 designates a metal piece having a socket or bottomed hole therein, 12 designating the bottom wall of the socket bore and 11 the original cylindrical surface of the bore in which the thread is formed.

In Fig. 1 the thread is shown roughed or partly formed from end to end of the cylindrical portion of the bore 11 by a roughing tap of the well known type having a tapered entering end portion and a following non-tapered portion upon both of which the tap thread extends. Except for the facts that the thread rib of the tap is considerably wider than the tap thread groove and the bottom of the tap thread groove is of less diameter than the original cylindrical bore 11 the tap is designed to thread, leaving interdental portions on the lands with non-cutting edges parallel with the axis of the tap this roughing tap is of ordinary construction.

The roughing tap has a cylindrical shank 13 with the usual polygonal end portion 14, and a threaded body having a tapered entering end portion, and a non-tapered or cylindrical portion between the tapered portion and the tap shank. The tap thread rib and tap thread groove extend around both the tapered and non-tapered portions of the body and both being interrupted by the tap flutes 17, of which there are preferably four, to form a helical series of thread groove developing teeth 15 and a helical series of non-cutting interdental portions 16 on the four lands of the tap body. The teeth have oppositely inclined side edges flaring outwardly from each other from their upper edges to the interrupted bottom of the thread groove which forms the top surfaces of the non-cutting interdental portions.

In the particular construction shown for cutting a standard Dardelet internal thread, 1 the side edges of the teeth 15 are each inclined 14½ degrees from a perpendicular to the tap axis, the top surfaces of the teeth are considerably wider than the top surfaces of the interdental portions. The tops of the teeth are parallel with the axis of the tap on the non-tapered portion and are chamfered or inclined to the axis on the tapered portion of the tap as shown, the angle or slope of the chamfered teeth and the taper line of the entering portion of the tap at the tops of the chamfered teeth being indicated by the dot-and-dash line T—T in Figs. 2 and 4. The tops of the interdental portions 16 are parallel with the tap axis and the minor or root diameter of the tap thread is constant and less than the diameter of original bore 11 of the bottomed hole so that the tap does not touch or act upon the crest metal of the rib of the roughed or unfinished thread developed on piece 10 by the groove cutting action of the teeth 15 of the roughing tap, as shown in Fig. 1.

It will be observed, from Fig. 1 and the foregoing description, that the roughing tap leaves the crest of the thread rib 18 on piece 10 unfinished from end to end and also leaves the thread groove in piece 10 only partly developed at the inner portion of the bottomed hole. The thread is completed, after withdrawal of the roughing tap, by advancing fully into the hole, as shown in Fig. 2, a finishing tap of the bottoming type of novel construction, this tap being shown in Figs. 2, 3 and 4.

The finishing tap is of well known form except for the threading thereon, having a cylindrical shank 19 with a polygonal end portion 20 and a non-tapered or cylindrical threaded body preferably having four flutes 21 interrupting the tap thread rib and groove to form a helical series of cutting teeth 22 and a helical series of cutting interdental portions 23 on the four lands 24 of the tap body. The thread of the finishing tap is of the same major or crest diameter as that of the non-chamfered portion of the thread of the roughing tap so that teeth 15 and 22 are correlated as hereinafter explained, but the thread groove of the finishing tap is more shallow than that of the roughing tap and its bottom surface makes an angle of 6 degrees with the axial line of the tap, sloping inwardly toward the shank end of the tap, as shown. The tops of the interdental cutting portions 23 thus are inclined to the tap axis and said interdental portions are adapted to cut away the metal across the unfinished crest of the thread rib 18 of piece 10 to form on the crest of said rib an inclined locking surface portion 25 making an angle of 6 degrees with the axial line of the internal thread of the bottomed hole in piece 10.

The tops of teeth 22 are parallel with the axis of the tap and the same distance therefrom and the same width as the tops of the unchamfered teeth 15 on the non-tapered body portion of the roughing tap. The upper portions of teeth 22 above the line P—P (Figs. 2 and 4) having their sides inclined downward and outward at an angle of 14½ degrees to a perpendicular to the tap axis, so that said teeth above said line are the same size and shape as the corresponding portions of the unchamfered ones of the teeth of the roughing tap.

The bottom of the thread groove of the finishing tap is made materially wider than that of the roughing tap to afford cutting edges at the tops of interdental portions 23 which are wider than the top portion of the rib 18 of the unfinished thread. The widened groove bottom facilitates accurate grinding of the interdental portions at the 6 degree taper and insures an effective cutting edge portion of this slope extending entirely across the rib 18 when the tap is in use.

The widened interdental cutting portions 23 are preferably obtained by making the sides of teeth 22 perpendicular to the axis of the tap below line P—P, as shown. These perpendicular side edges do not extend outward a greater distance than the top of the lowest chamfered tooth of the roughing tap, i. e. line P—P does not extend outside of line T—T at the entering ends of the taps, and preferably line P—P is at a radial distance from the axis of the finishing tap that is slightly less than the radial distance of the taper line T—T of the roughing tap from the roughing tap axis at the entering end of the roughing tap, as shown.

It will be obvious that by advancing the finishing tap into the hole to the position shown in Fig. 2, after withdrawal of the roughing tap, the cutting interdental portions 23 will trim off the previously untouched crest of the thread rib 18 the full length of the internal thread, while the top portions of teeth 22 having the inclined side edges will complete the cutting of the thread groove of the internal thread to full depth the full length of the hole, and that the side walls of the thread rib 18 will be finished smoothly at the 14½ degree slope from a perpendicular to the axis of the tap, as will be apparent from Figs. 2 and 4. By having the top portions of all the teeth 22 above line P—P the same size and shape as the top portions of the full size teeth 15 of the roughing tap, the finishing tap is accurately guided and centered and effectively lead into the incompletely threaded hole, insuring cutting of the internal thread in piece 10 to an accurate profile from end to end of the hole in the piece.

It will be observed that the teeth of the finishing tap have cutting edges along their tops, short inclined side cutting edge portions and perpendicular non-cutting side edge portions, and that the interdental portions of the finishing tap have cutting edges along their tops all located the same distance from the crest of the tap thread and inclined to the axis of the tap and wider than the cut they have to make across the unfinished rib of thread 18. A wider grinding wheel may be employed to grind portions 23 to accurate size and taper and wear at the edges of the grinding wheel will not affect the profile of the active cutting portions of the several interdental portions.

By leaving the cutting of locking surface 25 of the thread in piece 10 entirely for the finishing tap marring thereof or enlarging thereof by the finishing tap at any point is prevented. The thread cutting work done by the two taps is also advantageously divided, the finishing tap deepening the thread groove to full depth along the inner portion of the hole and trimming the crest of the thread rib from end to end of the hole. By the means and method described a perfect Dardelet thread may be cut the full length of a bottomed hole with a minimum of time and labor and a minimum number of cutting tools.

The tops of the teeth 22 and interdental portions 23 are preferably given a slight relief back of their leading or cutting edges, as shown in Fig. 3.

In Fig. 5 an externally threaded piece 26 is shown screwed into internally threaded piece 10 with their Dardelet threads in locked or self-holding relation, the helicoidal locking surface 25 of the thread of piece 10 being tightly jammed, by relative axial displacement between the threads, upon the coactive helicoidal locking surface 27 of the thread of piece 26, with the rib 18 of the internal thread abutting rib 28 of the external thread, in the well known manner.

While the tapping of a bottomed hole with a Dardelet thread has been shown and described, it will be obvious that the taps shown may be employed to thread a through-and-through hole in a piece such as a nut, in which case the roughing tap would be first run through the nut, and then the finishing tap run through the nut to cut the locking surface 25 of the internal thread.

What I claim is:

1. A combined bottoming and crest finishing tap for finishing Dardelet locking threads in bottomed holes, characterized by the fact that the tap has a fluted and non-tapered threaded body with a helical series of teeth having top cutting edges all parallel with and equidistant from the tap axis and inclined cutting side edge portions diverging from each other from the top cutting edges and also have non-cutting side edge portions substantially perpendicular to the axis of the tap merging with the cutting side edge portions, said body having a helical series of interdental cutting edges inclined to the axis of the tap the ends of which join the inner ends of the non-cutting side edges of the teeth, said interdental cutting edges all sloping inward toward the same end of the tap body and bearing the same radially displaced relation to the axis of the tap.

2. A combined bottoming and finishing tap for completing Dardelet locking threads in bottomed holes, characterized by the fact that the tap has a non-tapered threaded body carrying a helical series of teeth with cutting edges across their tops and diverging cutting edges extending part way only down their sides, and a helical series of interdental cutting portions having cutting edges inclined to the axis of the tap longitudinally of the tap and all sloping inward toward the same end of the tap and located the same distance from the axis of the tap at the center of the tap thread groove.

3. A combined bottoming and locking surface cutting tap for finishing Dardelet threads in a bottomed hole, comprising a shank, and a non-tapered body threaded and fluted to provide on the body a helical series of identical teeth having upper cutting portions with top cutting edges parallel with the tap axis and side cutting edges diverging toward the tap axis and terminating short of the bases of the teeth, and a helical series of identical interdental cutting portions extending to the non-cutting sides of each two adjacent teeth on each land of the tap at the bases of the teeth and having cutting edges inclined at an angle to the axial line of the tap and sloping inward toward the shank end of the tap.

4. A combined bottoming and locking surface cutting tap for finishing Dardelet threads in a bottomed hole, comprising a shank, and a non-tapered body threaded and fluted to provide on the body a helical series of identical teeth having upper cutting portions with top cutting edges parallel with the tap axis and side cutting edges diverging toward the tap axis and terminating short of the bases of the teeth, and a helical series of identical interdental cutting portions extending to the non-cutting sides of each two adjacent teeth on each land of the tap at the bases of the teeth and having cutting edges inclined at an angle to the axial line of the tap and sloping inward toward the shank end of the tap, the sides of the teeth from the interdental cutting portions to the diverging side cutting edges of the teeth being perpendicular to the axis of the tap.

5. A toothed thread cutter for finishing Dardelet threads having a row of teeth located side by side, said teeth having cutting edges along their tops all lying in a single straight line, non-cutting side edge portions substantially perpendicular to said line and cutting edge portions converging from the non-cutting edges to the ends of the top cutting edges, said cutter having interdental cutting edges all inclined in the same direction and at the same angle relatively to the top cutting edges of the teeth and extending between the non-cutting side edges of the teeth.

6. A tap, for use in cutting internal Dardelet locking screw threads, having on one of its lands a pair of teeth with truncate top portions and base portions the adjacent sides of which are disposed more abruptly to the tap axis than the sides of said truncate portions, said land having an interdental cutting edge extendng from base to base of said teeth and slightly inclined to the tap axis.

7. A finishing tap for completing Dardelet locking screw threads, comprising a fluted body the lands of which have teeth with top cutting edges and side cutting edges extending part way only down their sides and converging toward the tops of the teeth, the base portions of the teeth having non-cutting side edges disposed more abruptly to the tap axis than said cutting side edges, and the lands having cutting interdental portions with top cutting edges connecting the bases of adjacent teeth and all slightly inclined to the tap axis toward one and the same end of the tap.

In testimony whereof I hereunto affix my signature.

LEWIS B. BRIDGES.